US007161007B2

(12) United States Patent
Bäbler et al.

(10) Patent No.: US 7,161,007 B2
(45) Date of Patent: Jan. 9, 2007

(54) OXIDATION PROCESS FOR PREPARING QUINACRIDONE PIGMENTS

(75) Inventors: Fridolin Bäbler, Teresópolis (BR); Hans Rudolf Merstetter, Chadds Ford, PA (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 143 days.

(21) Appl. No.: 10/517,412

(22) PCT Filed: Jul. 8, 2003

(86) PCT No.: PCT/EP03/07337

§ 371 (c)(1), (2), (4) Date: Dec. 3, 2004

(87) PCT Pub. No.: WO2004/007623

PCT Pub. Date: Jan. 22, 2004

(65) Prior Publication Data

US 2005/0176959 A1 Aug. 11, 2005

Related U.S. Application Data

(60) Provisional application No. 60/430,522, filed on Nov. 27, 2002.

(51) Int. Cl.
*C07D 471/02* (2006.01)
*C09B 48/00* (2006.01)

(52) U.S. Cl. .................................................... 546/156

(58) Field of Classification Search ................. 546/156
See application file for complete search history.

(56) References Cited

U.S. PATENT DOCUMENTS

| | | | | |
|---|---|---|---|---|
| 5,840,901 | A | 11/1998 | Bäbler | 546/49 |
| 6,225,472 | B1 | 5/2001 | Bäbler | 546/49 |
| 6,264,733 | B1 | 7/2001 | Bäbler | 106/495 |
| 6,803,467 | B1 * | 10/2004 | Grinter et al. | 546/156 |

FOREIGN PATENT DOCUMENTS

| | | |
|---|---|---|
| EP | 0697413 | 2/1996 |
| EP | 0806456 | 11/1997 |
| EP | 0894832 | 2/1999 |

* cited by examiner

*Primary Examiner*—Kamal A. Saeed
(74) *Attorney, Agent, or Firm*—Shiela A. Loggins

(57) ABSTRACT

The present invention relates to a process of preparing quinacridone by oxidizing a 6,13-dihydroquinacridone salt corresponding to the quinacridone pigment with hydrogen peroxide as the oxidizing agent in the presence of 2,7-anthraquinone disulfonic acid as catalyst. The inventive process is economical and environmentally friendly and yields high performance quinacridone pigments in a high yield.

20 Claims, No Drawings

OXIDATION PROCESS FOR PREPARING QUINACRIDONE PIGMENTS

The application is a 371 of PCT/EP03/07337 filed 8 Jul. 2003 which claims benefit under 35 U.S.C. 119(e) of U.S. Provisional Application No. 60/430,522 filed 27 Nov. 2002.

The present invention relates to a process for the preparation of quinacridone pigments by oxidation of the corresponding 6,13-dihydroquinacridone in the presence of specific catalysts using hydrogen peroxide as oxidant.

Quinacridone pigments are known for their attractive red and magenta colors and for their outstanding fastness properties. It is well known in the art to prepare quinacridone pigments by oxidizing the correspondingly substituted 6,13-dihydroquinacridone.

For example, numerous publications disclose the oxidation of a 6,13-dihydroquinacridone to the corresponding quinacridone using aromatic nitro compounds as the oxidizing agent in an alcoholic medium containing a base and a small amount of water. However, such processes have the disadvantage of producing considerable organic waste due to the generation of reduced aromatic by-products.

It is also known to oxidize a 6,13-dihydroquinacridone to the corresponding quinacridone by a process wherein the 6,13-dihydroquinacridone is oxidized in a solvent and/or aqueous basic system with an oxygen-containing gas. Such processes are often referred to as "air oxidation" because air is conveniently used as the oxygen-containing gas. Air oxidation processes have the disadvantage that large gas volumes have to be introduced into a heterogeneous reaction mixture, whereby foam is generated. Additionally, it is difficult to determine when the reaction is complete.

Furthermore, it is known to oxidize 6,13-dihydroquinacridones dissolved in polar solvents, for example dimethyl sulfoxide (DMSO), using air as the oxidizing agent. Such processes have the advantage of generating excellent quinacridone pigments in a high yield. However, they have the disadvantage of producing a substantial amount of organic waste, such as dimethylsulfone, as by-product during the oxidation reaction, which requires costly solvent regeneration systems.

GB-887,373 discloses a process for the manufacture of quinacridones by the oxidation of 6,13-dihydroquinacridones in alkaline solution, wherein the oxidation is carried out using anthraquinone sulfonic acid as oxidizing agent. Although, they claim in particular the anthraquinone-2,7-disulfonic acid as the oxidizing agent, the process is environmentally unfriendly, since a large quantity of the anthraquinone oxidizing agent based on the 6,13-dihydroquinacridone is needed. Additionally, due to the large amount of anthraquinone compounds present such final quinacridones contain rests of anthraquinone derivates, which can migrate or change the hue of the quinacridone.

U.S. Pat. No. 5,840,901 discloses that the salts of the unsubstituted or substituted dihydroquinacridone(s) are easily oxidized in the presence of a quinone catalyst as slurry in a basic liquid phase at elevated temperatures using hydrogen peroxide as oxidizing agent. Such process offers the advantage of obtaining the quinacridone product in high yield, substantially free of the starting material. In addition, the crystal modification of the quinacridone product is controlled by the reaction conditions.

The use of hydrogen peroxide as oxidizing agent is additionally advantageous in that it is economical and has high oxidation efficiency at ambient pressure. It is readily available and does not generate a reduced organic by-product, as it is the case, for example, with organic nitro compound oxidants. Furthermore the quinone for example the anthraquinone sulfonic acids are used only in catalytic amount.

Thus, the present invention describes an improved oxidation process for the preparation of high performance quinacridone pigments in high yield by an economical and environmentally friendly route using a selected catalyst compound(s).

The present invention relates to a process for preparing a quinacridone of the formula (I)

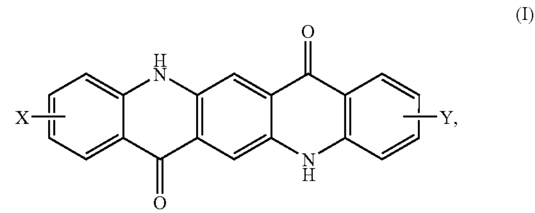

wherein X and Y are independently of one another selected from the group consisting of H, F, Cl, $C_1$–$C_3$alkyl and $C_1$–$C_3$alkoxy, by the oxidation of a salt of the corresponding 6,13-dihydroquinacridone of the formula (II)

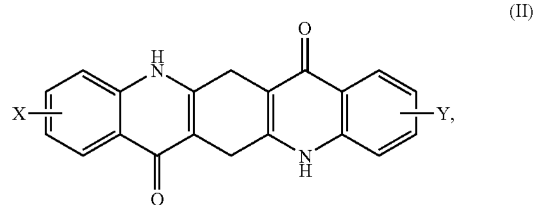

which comprises oxidizing the corresponding 6,13-dihydroquinacridone salt with hydrogen peroxide in the presence of a selected catalyst.

Generally, the salt of the 6,13-dihydroquinacridone of formula (II) is a mono and/or di-alkali metal salt or a mixture thereof. Di-alkali metal salts are preferred. Most preferred are the disodium and/or dipotassium salts.

The 6,13-dihydroquinacridone salt is prepared, for example, by stirring the 6,13-dihydroquinacridone in a basic medium, for example a basic mixture of water and an alcohol, at a temperature above 30° C., preferably 40 to 60° C., and most preferably between 50° C. and the reflux temperature, for 5 minutes to 2½ hours, preferably 20 minutes to 1½ hours.

Generally, the oxidation is carried out in a reaction medium obtained by combining a slurry, which consists essentially of the 6,13-dihydroquinacridone, the catalyst, a base and a suitable liquid phase, with an aqueous solution of hydrogen peroxide.

In general, a suitable liquid phase is any liquid media that promotes the oxidation reaction, and which does not react to a significant extent with the hydrogen peroxide oxidizing agent.

Commonly, the liquid phase is a mixture of a lower alcohol and water which contains 20 to 750 parts, preferably 40 to 600 parts of water, and 50 to 750 parts, preferably 100 to 600 parts, of alcohol per 100 parts 6,13-dihydroquinacridone; parts being parts by weight.

The lower alcohol is for example a $C_1$–$C_6$ alcohol such as methanol, ethanol, ethylene glycol, n-propanol, isopropanol, n-butanol, isobutanol, 2-butanol or tert-butanol, advantageously a $C_1$–$C_3$ alkanol, preferably methanol. The reaction medium is preferably substantially free of other organic solvents. However, organic solvents are tolerated in the reaction medium as long as they do not impair the 6,13-dihydroquinacridone salt generation or the oxidation reaction.

Any base capable of forming the salt of the 6,13-dihydroquinacridone is useful in the reaction medium. Preferably, the base is an alkali metal hydroxide, most preferably sodium or potassium hydroxide. In certain instances, it is advantageous to use a mixture of sodium hydroxide and potassium hydroxide.

The molar ratio of the base to 6,13-dihydroquinacridone is typically from 1 to 7 moles of base per mole of the 6,13-dihydroquinacridone. Preferably, the reaction medium contains from 2.2 to 5 moles of base per mole of the 6,13-dihydroquinacridone.

The generation of the 6,13-dihydroquinacridone salt is observable under the light microscope by the formation of crystals of the 6,13-dihydroquinacridone salt. Depending on the reaction conditions, the kind of base and/or the substituents on 6,13-dihydroquinacridone, the salt is generally in the form of needles, prisms, cubes or platelets.

To avoid potential side reactions as well as for a more controllable process, the oxidation reaction is preferably carried out under an inert gas flow, for example a nitrogen flow.

In an optimized process, the oxidation is carried out by combining an aqueous solution of the hydrogen peroxide oxidant with a slurry of the 6,13-dihydroquinacridone in a basic mixture of aqueous alcohol and base over a time interval of 5 minutes to 6 hours, preferably over 30 minutes to 4 hours, and subsequently maintaining the reaction medium at an elevated temperature (for example from 30° C. to about 120° C., if desired under pressure) with stirring for a period of time to complete the oxidation and promote pigment recrystallization. Preferably, the reaction medium is maintained at a temperature above 50° C., preferably at reflux temperature for an interval of 5 minutes to 5 hours, preferably 5 minutes to 30 minutes, after the addition of the hydrogen peroxide. The pigment is then isolated by filtration, washing with hot water or alcohol followed by hot water and drying. The base and the alcohol can be easily regenerated from the filtrate.

The aqueous solution of hydrogen peroxide generally contains from 1 to 50 weight-%, preferably 5 to 30 weight-%, and most preferably 10 to 25 weight-%, of hydrogen peroxide.

The oxidation of the 6,13-dihydroquinacridone salt to the corresponding quinacridone by hydrogen peroxide is visually followed by the color change of the reaction mixture.

In general, a small excess of the hydrogen peroxide is used. The molar ratio of hydrogen peroxide to 6,13-dihydroquinacridone is, for example, from 1.1 to 5 moles, preferably from 1.2 to 3.5 moles, of hydrogen peroxide per mole of the 6,13-dihydroquinacridone.

The presence of an oxidation-promoting amount of the catalyst during the oxidation step leads to a higher yield of quinacridone. Additionally, the presence of the catalyst under the oxidation conditions described above, results in a quinacridone product that is substantially free of quinacridonequinone, for example containing less than 2.5 percent by weight of quinacridonequinone. However, minor amounts of quinacridonequinone are tolerated in the product as long as its presence does not substantially reduce the saturation of the final quinacridone pigment.

Quinone catalysts, such as the anthraquinone sulfonic acid derivatives, catalyze the oxidation of 6,13-dihydroquinacridone under the present reaction conditions. Surprisingly, it was discovered that the effectiveness of such anthraquinone sulfonic acid catalysts can be highly variable when used in the preferred reaction media using hydrogen peroxide as oxidizing agent. Furthermore, depending on its chemical structure such anthraquinone sulfonic acid derivatives can undergo be converted to other soluble or insoluble colored reaction products that can lead to undesirable hue changes of the resulting quinacridone pigment.

Applicants found that 2,7-anthraquinone disulfonic acid and its mono or di sodium or potassium salts are particularly valuable catalysts. Thus, the instant catalyst is of formula (III)

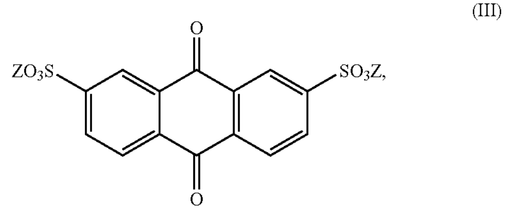

wherein each Z is independently of the other H, Na or K.

Relative to other available anthraquinone disulfonic acids, such as the 2,6-, 1,5- or 1,8-anthraquinone disulfonic acids, 2,7-anthraquinone disulfonic acid catalyzes the present oxidation reaction in a surprisingly high, efficient way. Furthermore, residues of the 2,7-anthraquinone disulfonic acid catalyst as well as of its chemically modified oxidation reaction products are much easier removed during the filtration and washing process of the quinacridone. Thus, by using 2,7-anthraquinone disulfonic acid as catalyst the resulting quinacridone pigment shows a high purity and a high chroma.

The 2,7-anthraquinone disulfonic acid catalyst is present in the reaction medium in an amount effective to catalyze the oxidation reaction, for example from 0.005 to 0.1 times the weight of 6,13-dihydroquinacridone, and most preferably from 0.01 to 0.05 times the weight of 6,13-dihydroquinacridone.

Without limiting this invention to any particular theory, it is believed that the 2,7-anthraquinone disulfonic acid catalyst acts to oxidize the 6,13-dihydroquinacridone and is itself reduced to the corresponding leuco compound, which is then regenerated by the hydrogen peroxide.

Depending on the kind of the 6,13-dihydroquinacridone, the oxidation conditions, the amount of catalyst used and in particular the kind of base and its concentration, the amount of catalyst residues detected on the final pigment by using 2,7-anthraquinone disulfonic acid as a catalyst is generally less than 1000 ppm, commonly less than 100 ppm or even undetectable when determined by the HPLC analytical method.

The 2,7-anthraquinone disulfonic acid can be of a technical quality. Thus, it can contain other chemical compounds or impurities such as other anthraquinone derivatives as long as such by products do not significantly impact the oxidation reaction and the generation of a high purity and high chroma quinacridone pigment.

Depending on the composition of the liquid phase, the recrystallization time and temperature, transparent smaller particle size or opaque larger particle size quinacridone pigments are generated. Lower temperatures and shorter times favor a transparent product, while higher temperatures and longer times favor a more opaque product.

Generally, the reaction mixture is stirred at a temperature of about 50° C. to the medium's reflux temperature for an interval of about 5 minutes to about 5 hours, preferably 5 minutes to 30 minutes to complete the oxidation and promote pigment recrystallization.

Additionally, it is advantageous to add a particle growth inhibitor or specific crystal phase directors before or after the 6,13-dihydroquinacridone salt generation to control the pigment particle size and the crystal phase of the oxidized quinacridone pigment. Particle growth inhibitors, also known as antiflocculating or rheology-improving agents, are well known. Suitable particle growth inhibitors and phase directors include, for example, phthalimidomethylquinacridone, imidazolylmethylquinacridone, pyrazolylmethylquinacridone, quinacridone sulfonic acid and its salts, for example the aluminum salt, or 1,4-diketo-3,6-diphenylpyrrolo[3,4-c]pyrrole sulfonic acid and its salts as well as dihydroquinacridone and quinacridone derivatives as described in the U.S. Pat. No. 6,225,472 and U.S. Pat. No. 6,264,733, which are each incorporated herein by reference.

For achieving an optimum effect, the particle growth inhibitor is added in an amount of from 0.05 to 8%, preferably from 0.1 to 5% by weight based on 6,13-dihydroquinacridone, prior to oxidation, preferably before or after the 6,13-dihydroquinacridone salt generation.

The instant process is especially useful for the preparation of quinacridone, 2,9-dichloroquinacridone, 2,9-difluoroquinacridone, 4,11-dichloroquinacridone, 4,11-difluoroquinacridone, 2,9-dimethyl-quinacridone and 2,9-dimethoxyquinacridone.

Additionally, the process is also suitable for the preparation of solid solutions containing one or more quinacridone components. Thus, an aspect of this invention relates to the process wherein a mixture containing two or more 6,13-dihydroquinacridones of formula (II) which are co-oxidized by the inventive process to yield a quinacridone solid solution product.

The process of this invention is particularly practical for the preparation of quinacridone/2,9-dichloroquinacridone, quinacridone/4,11-dichloroquinacridone, quinacridone/2,9-dimethylquinacridone, quinacridone/2,9-dimethoxyquinacridone, 2,9-dichloroquinacridone/2,9-dimethylquinacridone, 2,9-dichloroquinacridone/2,9-dimethoxyquinacridone or 2,9-dimethylquinacridone/2,9-dimethoxyquinacridone solid solution pigments.

Since the 6,13-dihydroquinacridone salt generation reactions and the oxidation reaction are advantageously carried out sequentially in the same container, practically no handling losses occur. Thus, the process according to this invention provides a quinacridone product in a high yield.

Additionally, the inventive process selectively oxidizes the 6,13-dihydroquinacridone to the corresponding quinacridone easily. The end product normally contains less than 2.5% of the unreacted 6,13-dihydroquinacridone and less than 2.0% of the over oxidized quinacridone quinone. Typically, at least 96%, usually 97.5% and above, of the dihydroquinacridone is converted to the corresponding quinacridone.

Although the oxidation is carried out in a heterogeneous reaction medium, the inventive process provides quinacridone pigments with a narrow particle size distribution. Thus, due to their high purity and desirable narrow particle size distribution, the obtained quinacridone pigments manifest outstanding pigment properties, such as, for example, a high chroma.

The process of this invention is particularly suitable for the preparation of specific crystal modifications of the unsubstituted or substituted quinacridones, for example, the alpha, beta or gamma form of the unsubstituted quinacridone, the beta form of 2,9-dimethylquinacridone and the alpha and/or gamma form of 2,9-dichloroquinacridone.

Different crystal forms of the quinacridone product are generated depending the reaction conditions used, such as, for example, the kind and concentration of base and the composition of the liquid phase, and the kind and concentration of particle growth inhibitors, which may be present during the oxidation step. Additionally, the crystal modification of the quinacridone product is controlled by adding about from 1 to 10 percent of seed crystals of quinacridone pigment having the desirable crystal modification. The seed crystals are added preferably prior to the oxidation, most preferably prior to salt formation.

Depending on the end use, it may be advantageous to add texture improving agents and/or rheology improving agents, for example before the isolation of the pigment, preferably by blending into the aqueous presscake. Suitable texture improving agents are, in particular, fatty acids of above 12 carbon atoms, for example stearic or behenic acid or the amides or metal salts thereof, preferably calcium or magnesium salts, as well as plasticizers, waxes, resin acids such as abietic acid or metal salts thereof, colophonium, alkyl phenols or aliphatic alcohols such as stearyl alcohol or vicinal diols such as dodecanediol-1,2, and also modified colophonium/maleate resins or fumaric acid/colophonium resins or polymeric dispersants. The texture improving agents are preferably added in amounts of from 0.1 to 30% by weight, most preferably of from 2 to 15% by weight, based on the final product.

Suitable rheology improving agents are for example the above mentioned antiflocculating agents, which are added preferably in amounts of from 2 to 10% by weight, most preferably of from 3 to 8% by weight, based on the final product.

The present quinacridone and quinacridone solid solution pigments are suitable as coloring matter for inorganic or organic substrates. They are highly suitable for coloring high molecular weight materials, which can be processed to cast and molded articles or which are used in ink and coating compositions such as solvent or water based coatings, for example in automotive coatings.

Suitable high molecular weight organic materials include thermoplastics, thermoset plastics or elastomers, for example, cellulose ethers; cellulose esters such as ethyl cellulose; linear or crosslinked polyurethanes; linear, crosslinked or unsaturated polyesters; polycarbonates; polyolefins such as polyethylene, polypropylene, polybutylene or poly-4-methylpent-1-ene; polystyrene; polysulfones; polyamides; polycycloamides; polyimides; polyethers; polyether ketones such as polyphenylene oxides; and also poly-p-xylene; polyvinyl halides such as polyvinyl chloride, polyvinylidene chloride, polyvinylidene fluoride or polytetrafluoroethylene; acrylic polymers such as polyacrylates, polymethacrylates or polyacrylonitrile; rubber; silicone polymers; phenol/formaldehyde resins; melamine/formaldehyde resins; urea/formaldehyde resins; epoxy resins; styrene butadiene rubber; acrylonitrile-butadiene rubber or chloroprene rubber; singly or in mixtures.

Generally, the pigments are used in an effective pigmenting amount, for example, of from 0.01 to 30% by weight, preferably from 0.1 to 10% by weight, based on the weight of the high molecular weight organic material to be pigmented. Thus, the present invention also relates to a pigmented plastic composition, which comprises a plastic material, and an effective pigmenting amount of a pigment or pigment solid solution prepared according to a process of the present invention, and to a process for preparing said pigmented plastic compositions.

The present pigments are easily dispersible and can be readily incorporated into organic matrixes to provide homogenous colorations possessing high saturation and excellent light and weather fastness properties.

The high molecular weight organic materials are pigmented with the pigments of the present invention by mixing the pigments, if desired in the form of a masterbatch, into substrates using high shear techniques including roll mills or a mixing or grinding apparatus. The pigmented material is then brought into the desired final form by known methods, such as calendering, pressing, extruding, brushing, casting or injection molding.

The following examples further describe embodiments of this invention. In these examples all parts given are by weight unless otherwise indicated. The x-ray diffraction patterns are measured on a RIGAKU GEIGERFLEX diffractometer type D/Maxll v BX.

EXAMPLE 1

A one-liter flask equipped with a thermometer, stirrer and condenser is charged with 45 g 2,9-dichloro-6,13-dihydroquinacridone, 280 ml methanol and 136.8 g 45% aqueous potassium hydroxide. The mixture is stirred under a slow flow of nitrogen at reflux temperature for one hour generating the 2,9-dichloro-6,13-dihydroquinacridone-di-potassium salt. 1.4 g of sodium 2,7-anthraquinone-disulfonate are added. 67.6 g of an aqueous 16.9% hydrogen peroxide solution are then added at a rate of 0.3 ml/minute maintaining reflux under a slow nitrogen flow. The resulting bluish-red suspension is diluted with 100 ml cold water stirred for 5 minutes and filtered. The presscake is washed with methanol followed by hot water then dried yielding a magenta-colored pigment.

The product shows a purity of 97.4% 2,9-dichloroquinacridone with only 1.7% 2,9-dichloro-6,13-dihydroquinacridone left, as determined spectrophotometrically. A HPLC analysis shows less than 100 ppm catalyst residues on the 2,9-dichloroquinacridone pigment.

The 2,9-dichloro-quinacridone pigment shows the X-ray diffraction pattern of mainly a gamma crystal form, characterized by the following X-ray diffraction pattern:

| Scattering angle [°2θ] | Relative intensity [%] |
|---|---|
| 5.3 | 27 |
| 10.5 | 9 |
| 13.9 | 11 |
| 15.2 | 100 |
| 15.7 | 15 |
| 16.5 | 43 |
| 19.2 | 22 |
| 21.3 | 8 |
| 22.9 | 27 |
| 24.4 | 4 |
| 25.3 | 11 |
| 26.6 | 5 |
| 27.9 | 25 |
| 29.0 | 5 |
| 29.8 | 4 |

EXAMPLES 2 TO 5

The procedure above is repeated but using other anthraquinone sulfonic acid derivatives as catalyst instead of sodium 2,7-anthraquinone-disulfonate. The table below depicts the kind of catalyst, its supplier, and compares the purity of the resulting isolated 2,9-dichloro quinacridone of the examples 1 to 5.

| Example | Catalyst | Supplier | $Cl_2QA$ [%] | $Cl_2DQA$ [%] | $Cl_2QAQ$ [%] | Amount of catalyst residues in end product (by HPLC) |
|---|---|---|---|---|---|---|
| 1 | 2,7-AQDS | Pfaltz & Bauer | 97.4 | 1.7 | 0.9 | <100 ppm |
| 2 | 2-AQS | Aldrich | 97.9 | 1.8 | 0.3 | >5000 ppm |
| 3 | 2,6-AQDS | Aldrich | 81.7 | 17.2 | 1.1 | Not applied |
| 4 | 1,8-AQDS | Pfaltz & Bauer | 19.9 | 78.0 | 2.1 | Not applied |
| 5 | 1,5-AQDS | Aldrich | 1.1 | 87.7 | 2.8 | Not applied |

The 2,7-anthraquinone-disulfonic acid disodium salt (2,7-AQDS), Example 1, shows a high yield of 2,9-dichloro quinacridone ($Cl_2QA$) with small quantities on 2,9-dichloro-6,13-dihydroquinacridone ($Cl_2DQA$) and 2,9-dichloro quinacridone quinone ($Cl_2QAQ$), and very little catalyst residues (catalyst and catalyst reaction products) are detected on the isolated dried end product by HPLC measurement.

The known catalyst, anthraquinone-2-sulfonic acid sodium salt (2-AQS), Example 2, also generates a high yield on 2,9-dichloro quinacridone but disadvantageously the isolated 2,9-dichloroquinacridone end product contains traces of insoluble yellow colored anthraquinone compounds, mainly 2-methoxy anthraquinone, which is generated during the oxidation reaction.

Unexpectedly, the remaining anthraquinone-disulfonic acids, respectively its disodium salts, with the sulfonic acids in the 2,6-, 1,8- or 1,5-position (Example 3 to 5) show a much lower yield on 2,9-dichloro quinacridone and they are catalytically less effective under such reaction conditions.

EXAMPLE 6

A one-liter flask equipped with a thermometer, stirrer and condenser is charged with 50 g 6,13-dihydroquinacridone, 250 ml methanol, 36 ml water, 0.6 g phthalimidomethyl quinacridone as crystal phase director and particle size reducing agent and 75 g 50% aqueous sodium hydroxide. The mixture is stirred under a slow flow of nitrogen at reflux temperature for one hour generating the corresponding 6,13-dihydroquinacridone-di-sodium salt. 1.2 g 2,7-anthraquinone-disulfonic acid sodium salt is added and the resulting mixture is further stirred at reflux for 10 minutes. Subsequently, 91.4 g of an aqueous 17% hydrogen peroxide solution are added at a rate of 0.3 ml/minute maintaining reflux temperature under a slow nitrogen flow. The resulting bright red suspension is diluted with 100 ml cold water, stirred for 5 minutes and then filtered at 50–60° C. The presscake is washed with hot water then dried yielding a high chroma red gamma quinacridone pigment, which shows less than 100 ppm catalyst residues when analyzed by HPLC.

EXAMPLE 7

63.0 g of polyvinylchloride, 3.0 g epoxidized soya bean oil, 2.0 g of barium/cadmium heat stabilizer, 32.0 g dioctyl phthalate and 1.0 g of the gamma quinacridone prepared according to Example 6 are mixed together in a glass beaker using a stirring rod. The mixture is formed into a soft PVC sheet with a thickness of about 0.4 mm by rolling for 8 minutes on a two roll laboratory mill at a temperature of 160° C., a roller speed of 25 rpm and friction of 1:1.2 by constant folding, removal and feeding. The resulting soft PVC sheet is colored in an attractive red shade with excellent fastness to heat, light and migration.

EXAMPLE 8

5.0 g of the magenta 2,9-dichloroquinacridone pigment prepared according to Example 1, 2.5 g hindered amine light stabilizer, 1.0 g benzotriazole UV absorber, 1.0 g hindered phenol antioxidant and 1.0 g phosphite process stabilizer are mixed together with 1000 g of high density polyethylene at a speed of 175–200 rpm for 30 s after flux. The fluxed pigmented resin is chopped up while warm and malleable, and then fed through a granulator. The resulting granules are molded on an injection molder with a 5 minute dwell time and a 30 s cycle time at temperatures of 260° C. Homogeneously colored chips, which show a bright magenta color with excellent light stability, are obtained.

EXAMPLE 9

The procedure of Example 8 is repeated but using the red quinacridone pigment obtained according to Example 6 instead of 2,9-dichloroquinacridone, yielding bright red colored chips with an excellent light stability.

EXAMPLE 10

6.0 g of a 2,9-dichloroquinacridone pigment prepared according to Example 1, 9.0 g hindered amine light stabilizer, 3.0 g benzotriazole UV absorber, and 3.0 g hindered phenol antioxidant are mixed together with 1200 g ABS resin at a speed of 175–200 rpm for 30 ss after flux. The fluxed pigmented resin is chopped up while warm and malleable, and then fed through a granulator. The resulting granules are molded on an injection molder with a 7 minute dwell time and a 42 s cycle time at temperatures of 232° C. (450° F.) and 288° C. (550° F.) respectively. Homogeneously colored chips which show similar magenta color shades at each of the temperature steps are obtained.

EXAMPLE 11

Preparation of Automotive Paint

Millbase Formulation:

A pint jar is charged with 66 g acrylic resin, 14.5 g AB dispersant and 58.1 g solvent (SOLVESSO® 100 from American Chemical). 26.4 g quinacridone pigment obtained according to Example 6 and 980 g of 4 mm diameter steel diagonal rods are added. The mixture is milled in the jar for 64 hours on a roller mill. The millbase contains 16.0% pigment with a pigment/binder ratio of 0.5 and a total non-volatile content of 48.0%.

Masstone Color:

47.3 g of the above millbase, 36.4 g of clear solids color solution containing a melamine resin catalyst, non-aqueous dispersion resin and a UV absorber, and 16.3 gs of a balanced clear solid color solution containing a polyester urethane resin are mixed and diluted with a solvent mixture containing 76 parts xylene, 21 parts butanol and 3 parts methanol to a spray viscosity of 20–22 seconds measured by a #2 Fisher Cup.

The red resin/pigment dispersion is sprayed onto a panel twice at 1.5 minute intervals as basecoat. After 2 minutes, clear coat resin is sprayed twice at 1½ minute intervals onto the basecoat. The sprayed panel is then flashed with air in a flash cabinet for 10 minutes and then "baked" in an oven at 129° C. (265° F.) for 30 minutes, yielding a high chroma red colored panel, with excellent weatherability.

EXAMPLE 12

1000 g of polypropylene granules (DAPLEN PT-55®, from Chemie Linz) and 10 gs of the 2,9-dichloroquinacridone pigment obtained in Example 1 are thoroughly mixed in a mixing drum. The granules so obtained are melt spun at 260–285° C. to magenta colored filaments of excellent light fastness and textile fibers properties.

In addition to the embodiments described above, numerous variations of these embodiments can be made in accordance with this invention.

The invention claimed is:

1. A process for preparing a quinacridone of formula (I)

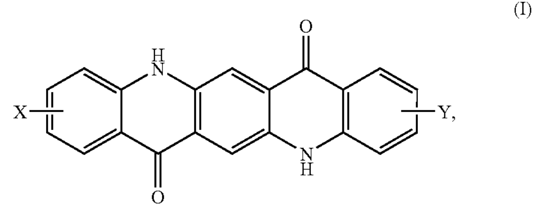

which comprises oxidizing a salt of a 6,13-dihydroquinacridone of formula (II)

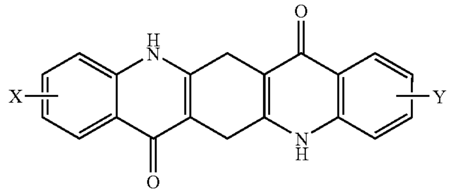

with hydrogen peroxide in the presence of a catalyst according to formula (III)

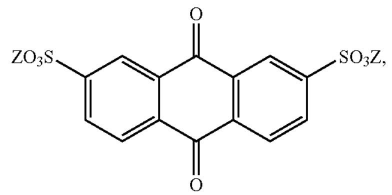

wherein X and Y are independently of one another selected from the group consisting of H, F, Cl, $C_1$–$C_3$alkyl and $C_1$–$C_3$alkoxy, and each Z is independently of the other H, Na or K.

2. A process of claim 1, wherein the 6,13-dihydroquinacridone salt is an alkali metal salt.

3. A process of claim 1, wherein the oxidation step is carried out by combining a slurry consisting essentially of the 6,13-dihydroquinacridone salt, the catalyst, a base and a liquid phase, with an aqueous solution of hydrogen peroxide.

4. A process of claim 3, wherein the liquid phase consists essentially of from 20 to 750 parts by weight of water and from 50 to 750 parts by weight of a lower alcohol per 100 parts by weight of 6,13-dihydroquinacridone.

5. A process of claim 4, wherein the alcohol is a $C_1$ to $C_3$ alcohol.

6. A process of claim 3, wherein the base is an alkali metal hydroxide which is present in an amount of from 1 to 7 moles per mole of the 6,13-dihydroquinacridone.

7. A process of claim 6, wherein the alkali metal hydroxide is sodium or potassium hydroxide, or a mixture thereof.

8. A process of claim 1, wherein the 2,7-anthraquinone-di-sulfonic acid catalyst is an alkali metal salt or a mixture thereof.

9. A process according to claim 1, wherein the catalyst is present in an amount of from 0.005 to 0.1 times the weight of the 6,13-dihydroquinacridone.

10. A process according to claim 1, wherein from 1 to 50% by weight aqueous solution of hydrogen peroxide is used.

11. A process according to claim 1, wherein from 1.1 to 5 moles of hydrogen peroxide per mole of 6,13-dihydroquinacridone are used.

12. A process of claim 3, wherein the aqueous solution of hydrogen peroxide is added to the slurry over an interval of from 5 minutes to 6 hours at a temperature of 30° C. or more and the reaction medium is subsequently maintained, with stirring, at a temperature of 30° C. or more to complete the oxidation and promote pigment recrystallization.

13. A process according to claim 1, wherein the oxidation step is carried out in the presence of from 0.05 to 8% by weight, based on the 6,13-dihydroquinacridone, of a particle growth inhibitor.

14. A process according to claim 1, wherein the quinacridone pigment is quinacridone, 2,9-dichloroquinacridone, 2,9-difluoroquinacridone, 4,11-dichloroquinacridone, 4,11-difluoroquinacridone, 2,9-dimethylqinacridone, 2,9-dimethoxyquinacridone or a quinacridone pigment solid solution selected from the group consisting of quinacridone/2,9-dichloroquinacridone, quinacridone/4,11-dichloroquinacridone, quinacridone/2,9-dimethylquinacridone, quinacridone/2,9-dimethoxyquinacridone, 2,9-dichloroquinacridone/2,9-dimethylquinacridone, 2,9-dichloroquinacridone/2,9-dimethoxyquinacridone and 2,9-dimethylquinacridone/2,9-dimethoxyquinacridone solid solutions.

15. A process of claim 14, wherein the quinacridone pigment is the alpha, beta or gamma form of unsubstituted quinacridone.

16. A process according to claim 1, wherein at least 96% by weight of the dihydroquinacridone is converted to the corresponding quinacridone.

17. A process according to claim 1 wherein the 6,13-dihydroquinacridone salt is a di-sodium or di-potassium salt.

18. A process of claim 3, wherein the liquid phase consists essentially of from 40 to 600 parts by weight of water and from 100 to 600 parts by weight of the alcohol, per 100 parts by weight of 6,13-dihydroquinacridone.

19. A process of claim 5, wherein the alcohol is methanol.

20. A process according to claim 13, wherein the particle growth inhibitor is selected from the group consisting of phthalimidomethyl-, imidazolylmethyl- and pyrazolylmethyl-quinacridone; phthalimidomethyl- and o-benzosulfimidomethyl-6,13-dihydroquinacridone; and quinacridone monosulfonic acid and 1,4-diketo-3,6-diarylpyrrolo[3,4-c]pyrrole sulfonic acid and their salts.

* * * * *

UNITED STATES PATENT AND TRADEMARK OFFICE
CERTIFICATE OF CORRECTION

PATENT NO. : 7,161,007 B2
APPLICATION NO. : 10/517412
DATED : January 9, 2007
INVENTOR(S) : Fridolin Bäbler et al.

It is certified that error appears in the above-identified patent and that said Letters Patent is hereby corrected as shown below:

The title page

Item (60) should read:
-- (60) Provisional application No. 60/396,377, filed on July 17, 2002 --.

Column 1

The first paragraph after the title should read:
-- The application is a 371 of PCT/EP03/07337, filed on July 8, 2003 which claims benefit under 35 U.S.C. 119(c) of U.S. Provisional application No. 60/396,377, filed on July 17, 2002. --.

Signed and Sealed this

Seventeenth Day of April, 2007

JON W. DUDAS
*Director of the United States Patent and Trademark Office*